Dec. 10, 1935.                    A. A. KIEFER                    2,023,787
                                MOTOR VEHICLE DOOR
                                Filed April 5, 1934
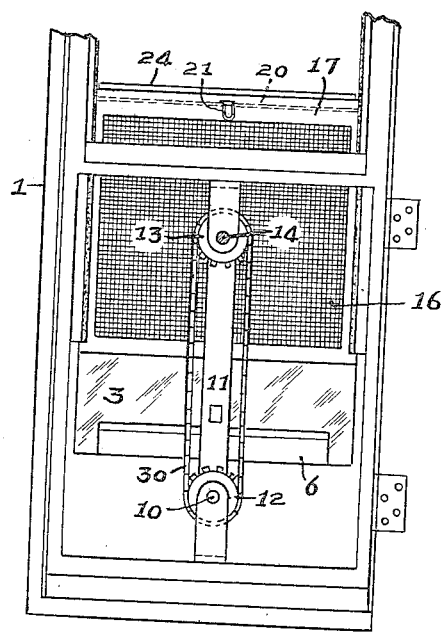
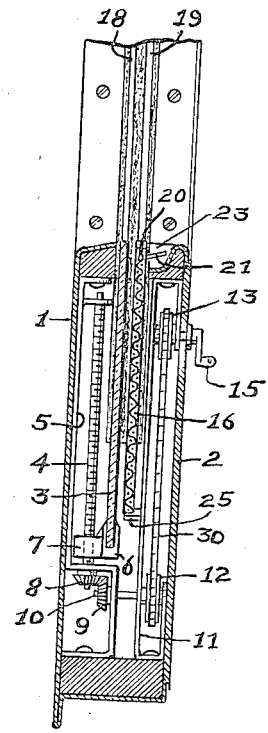
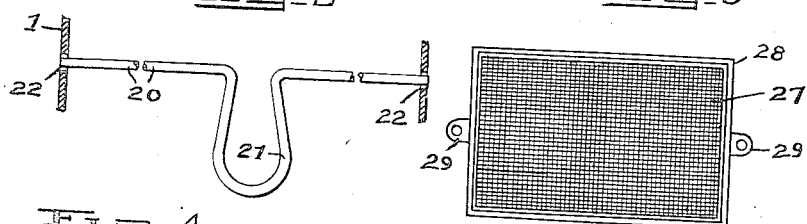
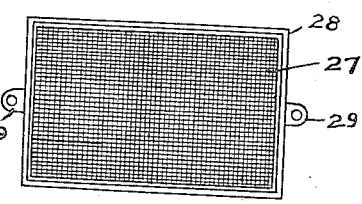
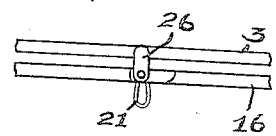
INVENTOR
Alvin A. Kiefer
By Jas R Snyder
Attorney Patented Dec. 10, 1935

2,023,787

UNITED STATES PATENT OFFICE 2,023,787

MOTOR VEHICLE DOOR

Alvin A. Kiefer, Rices Landing, Pa.

Application April 5, 1934, Serial No. 719,112

1 Claim. (Cl. 156—14)

My invention relates broadly to an improved motor vehicle door, and more particularly to a window screen embodied in the latter for the purposes of ventilation and for excluding flies, bugs, mosquitos and other insects from the motor vehicle.

Important objects of the invention are to provide a motor vehicle door screen of the character described, which is simple in its construction and arrangement, durable and efficient in its use, which is housed in the door structure when not in use, conveniently operable, compact, and comparatively inexpensive to manufacture.

With the foregoing and other objects in view, which will appear as the description proceeds, the invention resides in the novel construction, combination and arrangement of parts herein specifically described and illustrated in the accompanying drawing, but it is to be understood that the latter is merely illustrative of an embodiment of the invention, and that the needs of actual practice and manufacture may necessitate certain mechanical variations. It is, therefore, not intended to limit the scope of the invention to the disclosure thereof illustrated, but rather to define such limitations in the claim hereunto appended.

In the drawing wherein like numerals of reference designate corresponding parts throughout the several views:

Figure 1 is an inner side view of a motor vehicle door constructed in accordance with the invention, and having the back cover removed therefrom and with portions broken away.

Figure 2 is a vertical cross sectional view thereof.

Figure 3 is an enlarged side view of the screen operating element.

Figure 4 is a fragmentary top plan view of the window pane and associated screen provided with an inter-engaging catch member.

Figure 5 is a side view of a modified form screen that is not adapted for being housed in the door structure.

Referring in detail to the drawing 1 denotes a sedan type of motor vehicle door. The latter may be of any suitable metal construction and includes the usual fabric back cover 2, and has the top portion thereof provided with a window opening in the conventional manner well known in the art to which the invention appertains.

A glass window pane 3 is mounted in the door 1 and vertically shiftable in the latter by means of an adjusting screw 4, which extends vertically and is disposed adjacent to the outer wall of the door. The adjusting screw has its ends suitably journaled for rotation in a bearing bracket 5, which is fixed in position in the door structure in any suitable manner to best meet conditions found in practice.

The lower end of the window pane 3 is overlapped by a fixed metal channel reenforcing bar 6, which carries a fixed, centrally positioned operating nut 7. The latter is disposed on the outer side of the reenforcing bar and threadedly engages on the adjusting screw 4. By this arrangement it is obvious that, the rotation of the adjusting screw will actuate the operating nut to elevate or lower the window pane in the door, as the reenforcing bar provides a rigid connection between the operating nut and the window pane.

The lower end of the adjusting screw 4 carries a fixed bevel gear 8, which meshes with a corresponding bevel gear 9 fixed to the outer end of a drive shaft 10. The latter extends horizontally adjacent to the lower end of the door 1 and is journaled for rotation in the bearing bracket 5 and in a bearing bracket 11, which is fixed in position adjacent to the inner side of the door and to the latter.

A sprocket wheel 12 is fixed to the inner end of the drive shaft 10, and a similar sprocket wheel 13 is fixed on an operating shaft 14, which is revolubly mounted in the upper end of the bearing bracket 11.

The operating shaft 14 projects through the back cover 2 of the door 1, and carries a fixed operating handle 15, which is disposed on the inner side of the door below the window opening and within the easy reach of the operator. A transmission chain 30 operates on the sprocket wheels 12 and 13, whereby the rotation of the operating handle in either direction will impart rotation to the adjusting screw 4 to shift the window pane 3 to positions respectively opening or closing the latter in the door structure.

The necessity and use of a window pane operating mechanism of the type herein illustrated and described is evident, as the same provides an uninterrupted space between the window pane 3 and the bearing bracket 11 for the reception of the window screen 16 now to be described.

The window screen 16 is constructed from substantial mesh wire material mounted in a rectangularly-shaped metal frame 17, and is disposed parallel to the window pane 3 at the inner side of the latter. The window pane 3 and the window screen 16 are engaged for vertical slidable movement in separate grooves, respectively indicated at 18 and 19, which are formed in the door structure and lined with felt, rubber, or analogous cushioning strip material.

The window screen 16 is operated by an operating element 20, consisting of an integral length of resilient rod material, which is shiftably mounted in any suitable manner in the top member of the screen frame 17. The operating element 20 is provided with a centrally disposed looped handle 21 extending through an opening provided therefor in the inner side of the top member of the screen frame 17. The resilient looped handle 21 provides a spreading spring action tending to force the free ends of the operating element 20 beyond the respective ends of the top member of the screen frame 17 and into respective apertures 22, which are formed in the door structure at positions capable of being engaged only when the window screen 16 is in the closed position.

To release the window screen 16 from the closed secured position, it is only necessary to compress the looped handle 21 to disengage the free ends of the operating element 20 from the door apertures 22, thereby allowing the window screen to be lowered to the open position.

The door window sill is provided with a recess 23 for housing the looped handle 21 when the window screen 16 is in the lowered position. The top of the screen frame 17 carries a cushioning strip 24 to prevent damage to door parts contacting therewith. The lower end of the window screen seats upon a lug 25, which is stamped from the bearing bracket 11 and provided for limiting the lowering movement of the window screen in the door 1.

In Figure 4 the top of the window screen 16 is provided with a pivotally connected catch 26, which may be shifted to overlap the top of the associated window pane 3, whereby the window screen may be elevated to the closed position when the window pane is elevated by the operation of the operating handle 15. If the catch 26 is not employed, the window screen is elevated manually by the upward pull upon the looped handle 21.

Figure 5 illustrates a screen 27 provided with a surround 28 of rubber or other cushioning material and with a pair of opposed apertured lugs 29. The screen is adapted to be attached in the window opening in the door 1 by the lugs 29 engaged by the screws employed for securing the window trim, and is not intended to be lowered or otherwise shifted.

The preesnt invention provides a most efficient device of its kind, which may be readily utilized for excluding all insects from the interior of an automobile equipped therewith, and which may also be employed for maintaining the latter ventilated when parked during hot weather, as the window screen cannot be released from its closed position from the outer side of the latter.

What I claim is:

In a motor vehicle door provided with a window opening, a window pane vertically shiftable in the vehicle door, a window screen vertically shiftable in the vehicle door, a vertically disposed screw journaled for rotation in the vehicle door, an operating nut carried by said window pane and engaged on said screw, an operating element carried by the vehicle door for rotating said screw to adjust said window pane in the vehicle door, and a catch mounted on said window screen and shiftable to engage said window pane to shift said window screen to the closed position when said window pane is shifted to the closed position.

ALVIN A. KIEFER.